(12) United States Patent
Kunimori et al.

(10) Patent No.: US 7,936,346 B2
(45) Date of Patent: May 3, 2011

(54) LIQUID CRYSTAL DISPLAY DEVICE IMPLEMENTING PHOTODETECTOR TO CONTROL BACKLIGHT

(75) Inventors: Takashi Kunimori, Tottori (JP); Yutaka Sano, Tottori (JP); Masanori Yasumori, Tottori (JP)

(73) Assignee: Sony Corporation, Tokyo (JP)

( * ) Notice: Subject to any disclaimer, the term of this patent is extended or adjusted under 35 U.S.C. 154(b) by 836 days.

(21) Appl. No.: 11/902,689

(22) Filed: Sep. 25, 2007

(65) Prior Publication Data

US 2008/0079860 A1    Apr. 3, 2008

(30) Foreign Application Priority Data

Sep. 27, 2006   (JP) ................. 2006-262235

(51) Int. Cl.
   *G09G 5/00* (2006.01)
(52) U.S. Cl. ... 345/207; 345/102; 345/204; 250/214 AL
(58) Field of Classification Search .............. 345/87–88, 345/90, 92, 102, 207, 204; 250/214 AL
   See application file for complete search history.

(56) References Cited

U.S. PATENT DOCUMENTS

| | | | |
|---|---|---|---|
| 6,566,685 B2 * | 5/2003 | Morikawa et al. | 257/59 |
| 6,795,049 B2 * | 9/2004 | Toyoshima et al. | 345/93 |
| 6,888,571 B1 * | 5/2005 | Koshizuka et al. | 348/302 |
| 7,002,547 B2 * | 2/2006 | Yamada | 345/102 |
| 7,423,639 B2 * | 9/2008 | Min | 345/207 |
| 7,589,305 B2 * | 9/2009 | Kunimori et al. | 250/208.1 |
| 7,595,795 B2 * | 9/2009 | Shin et al. | 345/207 |
| 7,759,627 B2 * | 7/2010 | Kunimori et al. | 250/214 AL |
| 2005/0218302 A1 * | 10/2005 | Shin et al. | 250/214 R |
| 2007/0046619 A1 * | 3/2007 | Sano et al. | 345/102 |
| 2007/0153136 A1 * | 7/2007 | Tseng et al. | 348/790 |
| 2007/0229452 A1 * | 10/2007 | Sano et al. | 345/102 |
| 2008/0185501 A1 * | 8/2008 | Kunimori et al. | 250/214 AL |
| 2008/0224027 A1 * | 9/2008 | Kunimori et al. | 250/214 AL |
| 2008/0297466 A1 * | 12/2008 | Kunimori et al. | 345/102 |

FOREIGN PATENT DOCUMENTS

| | | |
|---|---|---|
| JP | 2000-122575 | 4/2000 |
| JP | 2001-169190 | 6/2001 |
| JP | 2002-131719 | 5/2002 |
| KR | 1020050097289 A | 10/2005 |
| KR | 1020060049960 A | 5/2006 |

* cited by examiner

*Primary Examiner* — Amare Mengistu
*Assistant Examiner* — Jason M Mandeville
(74) *Attorney, Agent, or Firm* — K&L Gates LLP

(57) ABSTRACT

A liquid crystal display device 1 according to an embodiment of the present invention includes a liquid crystal display panel, a photodetector unit LS1 that is built into the liquid crystal display panel and has a TFT ambient light photosensor, an ambient light photosensor reader Re1 for reading a voltage due to photo-leakage from the TFT ambient light photosensor, and a control means 20 for controlling the photodetector unit and the ambient light photosensor reader, and a backlight 24, etc., according to an output from the ambient light photosensor reader. The photodetector unit has a switching element SW2 coupled between a source line coupled to the TFT ambient light photosensor's source electrode $S_L$ and a drain line coupled to the TFT ambient light photosensor's drain electrode $D_L$. The control means 20 makes the source line and the drain line of the TFT ambient light photosensor be coupled to a common potential when changing a gate voltage of the TFT ambient light photosensor by keeping the switching element SW2 turned on. It is therefore possible to provide a liquid crystal display device that utilizes a thin film transistor as an ambient light photosensor and prevents degradation of an ambient light photosensor element due to a biased polarity voltage applied to the gate electrode.

16 Claims, 12 Drawing Sheets

(related art)

TFT AMBIENT LIGHT
PHOTOSENSOR (prior art)

(prior art)

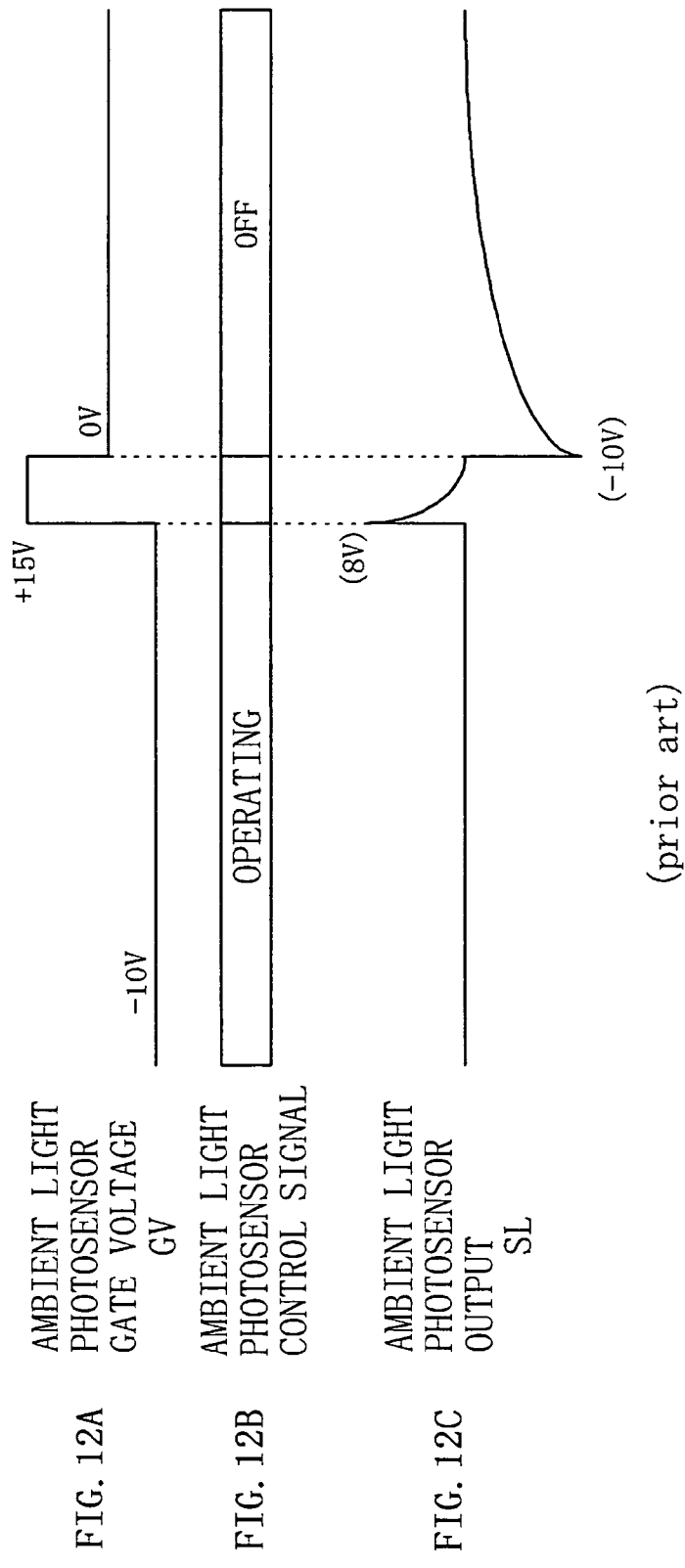

LIQUID CRYSTAL DISPLAY DEVICE IMPLEMENTING PHOTODETECTOR TO CONTROL BACKLIGHT

BACKGROUND

1. Technical Field

The present invention relates to a liquid crystal display device having an illuminating unit for illuminating a liquid crystal display panel, and more particularly to a liquid crystal display device in which an ambient light photosensor that senses external light is built into the liquid crystal display panel, and which the device controls the illuminating unit according to an output from such ambient light photosensor.

2. Related Art

Over recent years, particularly, liquid crystal display devices have been widely used not only in information and telecommunications equipment but also in electrical equipment in general. In such liquid crystal display devices, liquid crystals are non light-emitting, which means that images displayed are hard to see in dark places. Therefore these devices are provided with a backlight or a sidelight, etc., and when the external light is dim, such backlight is lit in order to illuminate the images displayed.

However, manual on/off controlling of such backlight requires the user's manipulation according to the brightness of external light. Such manipulations are bothersome, and the user sometimes ends up turning the backlight on even in bright places. In this case, using such display in a mobile telephone or similar equipment could cause the battery to run down quickly.

Accordingly, technology to address this problem has been known whereby an ambient light photosensor is built into the liquid crystal panel, the brightness of external light is sensed by such ambient light photosensor, and on/off controlling of such backlight is performed according to the sensing results (see JP-A-2002-131719 and JP-A-2000-122575).

For example, a liquid crystal display device described in JP-A-2002-131719 has a photodetector unit made of a thin film transistor (TFT) built into the liquid crystal display panel. The photodetector unit detects the photo-leakage current from the TFT ambient light photosensor and senses the brightness of external light. Thus the backlight is controlled automatically. Furthermore, a liquid crystal display device disclosed in JP-A-2000-122575 has an external light illuminance sensor and a backlight illuminance sensor, both of which employ a TFT. The backlight is controlled according to the sensing results of both sensors.

The TFT ambient light photosensors built into the liquid crystal display devices of JP-A-2002-131719 and JP-A-2000-122575 have a so-called photo-leakage characteristic that when no light is shed thereon a slight leakage current (dark current) flows in their gate-off regions, and when light is shed thereon a large leakage current flows corresponding to the intensity (brightness) of the light, as shown in FIG. 9. The TFT sensor having such characteristic is built into a photodetector circuit LS as shown in FIG. 10, for example. The photodetector circuit LS is so configured that a capacitor C is coupled in parallel between the TFT ambient light photosensor's drain electrode $D_L$ and source electrode $S_L$, and the source electrode $S_L$ and one terminal of the capacitor C are coupled to a standard voltage supply Vs via a switching element SW. Furthermore, the TFT ambient light photosensor's drain electrode $D_L$ and the other terminal of the capacitor C are grounded GR.

The operation of the photodetector circuit LS will be described as follows. First, a constant reverse bias voltage GV (for example −10 V) is applied to the gate electrode $G_L$ of the TFT ambient light photosensor. Then the switching element SW is turned on, whereby both ends of the capacitor C are applied with a constant standard voltage Vs (for example +2 V) and charged, and the switching element SW is turned off after a predetermined time period. Accordingly, as shown in FIG. 11, a source voltage that decreases as time passes depending on the brightness of the surroundings of the TFT ambient light photosensor, that is, a charging voltage, is provided to both ends of the capacitor C. Therefore, since the charging voltage on both ends of the capacitor C is inversely proportional to the surrounding brightness of the TFT ambient light photosensor, the brightness of external light is sensed by measuring the charging voltage at a predetermined time period to after the switching element SW is turned off.

In such photodetector circuit LS, since a constant reverse bias voltage is constantly applied to the TFT ambient light photosensor's gate electrode, the state where the biased polarity voltage is always applied continues. This results in charge being trapped on the TFT gate electrode, thereby causing degradation or characteristic change in a TFT sensor element, and reduced sensitivity of the sensor. As a result, a precise photodetection cannot be performed. Accordingly, in order to prevent degradation of the sensor element due to a biased polarity, a method is known in which a reset signal is applied to the gate electrode (see JP-A-2001-169190). However, when applying such reset signal to the photodetector circuit, it is difficult to control the applying timing. Therefore, for example, when applying such signal during charging or reading to/from the ambient light photosensor, there is a risk of causing the photodetector unit and the reader to malfunction. Also, when applying at other timing, a sequence control of controlling resetting, charging, and reading becomes necessary, therefore making the control circuit configuration complicated.

In such photodetector circuit LS, during circuit operation, parasitic capacitances $C_1$, $C_2$ occur between the gate electrode $G_L$ and the drain electrode $D_L$, and the gate electrode $G_L$ and the source electrode $S_L$. When the TFT ambient light photosensor is built on a TFT substrate, these parasitic capacitances $C_1$, $C_2$ cannot be eliminated between the above electrodes, because of the structure of a TFT element. On the other hand, an output line (line connected to the source electrode $S_L$) of the TFT ambient light photosensor is in a high impedance status when not charged. Accordingly, as shown in FIG. 12A, when the gate is turned on and at the moment the reverse bias voltage is converted from −10 V to +15 V, an ambient light photosensor output voltage is raised (for example, to +8 V) because of the parasitic capacitances $C_1$, $C_2$ (see FIG. 12C). At the same time, when the gate is turned off and at the moment the bias voltage is made to 0 V, the voltage of the drain side is lowered (for example, to −10 V) instantaneously by the parasitic capacitances $C_1$, $C_2$. As a result, such punch-through voltage and an inrush voltage generated by this punch-through voltage are applied to an external circuit via the output line. Accordingly, there is a risk of damaging the external circuit element coupled to the output line.

Moreover, in the case when the external light detecting circuit as described above is built into the liquid crystal display devices of JP-A-2002-131719 and JP-A-2000-122575, the photodetector circuits operate even at the time of so-called partial driving for, in general, displaying a minimum necessary part of image in the standby status of a mobile telephone, etc., when no external light is sensed. Accordingly, excess power consumption increases which causes quick battery drain.

SUMMARY

An advantage of some aspect of the invention is to provide a liquid crystal display device utilizing a thin film transistor (TFT) as an ambient light photosensor, and preventing the degradation of an ambient light photosensor element due to a biased polarity voltage applied to the TFT's gate electrode.

Another advantage of some aspect of the invention is to provide a liquid crystal display device preventing the breakage of a control circuit element coupled to the device's ambient light photosensor by means of a device for preventing the degradation of an ambient light photosensor element.

Further another advantage of some aspect of the invention is to provide a liquid crystal display device having a less power-consuming photodetector unit including an ambient light photosensor.

A liquid crystal display device according to an aspect of the present invention includes a liquid crystal panel, a photodetector unit that is built into the liquid crystal display panel and has a TFT ambient light photosensor made of a TFT that senses external light, an ambient light photosensor reader that reads a voltage due to photo-leakage from the TFT ambient light photosensor, and control means that controls the photodetector unit and the ambient light photosensor reader, and controls an illuminating unit that illuminates the liquid crystal display panel according to an output from the ambient light photosensor reader. The photodetector unit has a switching element coupled between a source line coupled to the TFT ambient light photosensor's source electrode and a drain line coupled to the TFT ambient light photosensor's drain electrode. The control means short-circuits the source line and the drain line of the TFT ambient light photosensor by keeping the switching element turned on when changing a gate voltage to be applied to a gate line coupled to the TFT ambient light photosensor's gate electrode.

In the present aspect, either one of the source line or the drain line of the TFT ambient light photosensor may be fixed to a ground potential or a direct potential.

With the above features, when changing the gate voltage to be applied to the gate electrode of the TFT ambient light photosensor, the source line and the drain line of the TFT ambient light photosensor have a common potential with the switching element turned on. Accordingly, even when parasitic capacitances are generated between the gate electrode and the source electrode, and the gate electrode and the drain electrode of the TFT ambient light photosensor respectively, charges accumulated in these parasitic capacitances are discharged via the switching element. Therefore, generation of excess inrush voltage or inrush current can be prevented. Hence, it is possible to prevent the degradation of the TFT ambient light photosensor without damaging an external control circuit element, etc., coupled to the ambient light photosensor.

In the aspect, the gate voltage of the TFT ambient light photosensor in a negative voltage applied state may be changed so as to be converted to a positive voltage and then converted to a negative voltage after a certain period of time, and the switching element is kept turned on during a time period from just before the gate voltage is converted from the negative voltage to the positive voltage until just after the gate electrode voltage is converted from the positive voltage to the negative voltage.

With the above features, when changing the liquid crystal display device to a standby status, the gate voltage in the negative voltage state is applied with the positive voltage for a predetermined period, and the negative voltage (off-voltage) is applied thereafter. Accordingly, since the switching element is turned off just before and just after the time period the gate voltage is changed in this manner, it is possible to safely change the liquid crystal display device into the standby status with an easy process.

In the aspect, the gate electrode of the TFT ambient light photosensor in a negative voltage applied state may be changed so as to be converted to a positive voltage and then converted to a negative voltage after a certain period of time. The switching element is kept turned on during a time period from just before until just after the gate electrode is converted from the negative voltage to the positive voltage, and from just before until just after the gate electrode is converted from the positive voltage to the negative voltage.

With the above features, when changing the liquid crystal display device to the standby status, a gate voltage in the negative voltage applied state is applied with the positive voltage for a predetermined period of time, and the negative voltage (off-voltage) is applied thereafter. Accordingly, since the switching element is turned off, among the time period the gate voltage is changed, just before and just after the gate voltage in the negative voltage applied state is applied with the positive voltage, and just before and just after the gate voltage in the positive voltage applied state is applied with the negative voltage (off-voltage), it is possible to safely change to the standby status of the liquid crystal device with an easy process.

In the aspect, the control means may change the gate voltage of the TFT ambient light photosensor.

In the aspect, the photodetector unit may have a resistor and a capacitor coupled to the gate line.

With the above features, it is possible to nearly eliminate the generation of excess inrush voltage and inrush current.

In the aspect, the control means may be provided with a standby status judging unit for judging whether equipment mounted with the liquid crystal display panel is in a normal operating status or in a standby status, and when the standby status judging unit judges that the equipment is changed from the normal operating status to the standby status, the switching element is turned on.

With the above features, since the control means is provided with the standby status judging unit for judging whether the equipment mounted with the liquid crystal display panel is in the normal operating status or in the standby status, this standby status judging unit judges that the equipment is changed from the normal operating status to the standby status, and applies a positive voltage to the gate electrode of the TFT ambient light photosensor for a certain period of time. Therefore it is possible to prevent the degradation of the TFT ambient light photosensor element with an extremely simple judging unit, and maintain the sensitivity characteristic of the ambient light photosensor. Also, the positive voltage is applied to the gate electrode of the TFT ambient light photosensor when the status is changed to the standby status. At this time, the ambient light photosensor reader is not operated, therefore reading will not be affected. Furthermore, when changing to the standby status, the operation of the photodetector unit, the ambient light photosensor reader, and a switching portion is stopped. Therefore, it is possible to reduce waste power consumption.

In the aspect, the standby status judging unit may judge as the standby status when a part of the display region of the liquid crystal display panel becomes a display status, and the remaining region becomes a non-display status.

In the aspect, the standby status judging unit may judge as the standby status when the display region of the liquid crystal display panel wholly becomes the non-display status.

With the above features, the standby status judging unit judges as the standby status, when a part of the display region of the liquid crystal display panel becomes the display status, and the remaining region becomes the non-display status, and when the whole region of the display region of the liquid crystal display panel becomes the non-display status. Hence, it is possible to judge as the standby status with extreme ease.

In the aspect, the TFT ambient light photosensor may be formed together with a TFT serving as the switching element in a process for manufacturing the liquid crystal display panel.

With the above features, since the TFT ambient light photosensor can be formed together in the process of manufacturing the TFT serving as a switching element in the liquid crystal display panel, there is no need to increase the number of manufacturing processes for providing the ambient light photosensor.

BRIEF DESCRIPTION OF THE DRAWINGS

The invention will be described with reference to the accompanying drawings, wherein like numbers reference like elements.

FIG. 12 is an operational waveform chart of the photodetector circuit of FIG. 10.

DESCRIPTION OF EXEMPLARY EMBODIMENTS

Exemplary embodiments of the invention will now be described with reference to the accompanying drawings. It should be understood however that the embodiments described below are by way of examples of liquid crystal display devices realizing the technical thought of the invention and are not to be construed as limiting the invention to these particular liquid crystal display devices. The invention can be applied equally well in numerous variations without departing from the scope and spirit of the claims appended hereto. The invention can equally well be adapted to other embodiments contained within the scope of the claims.

First Embodiment

Figure 1:
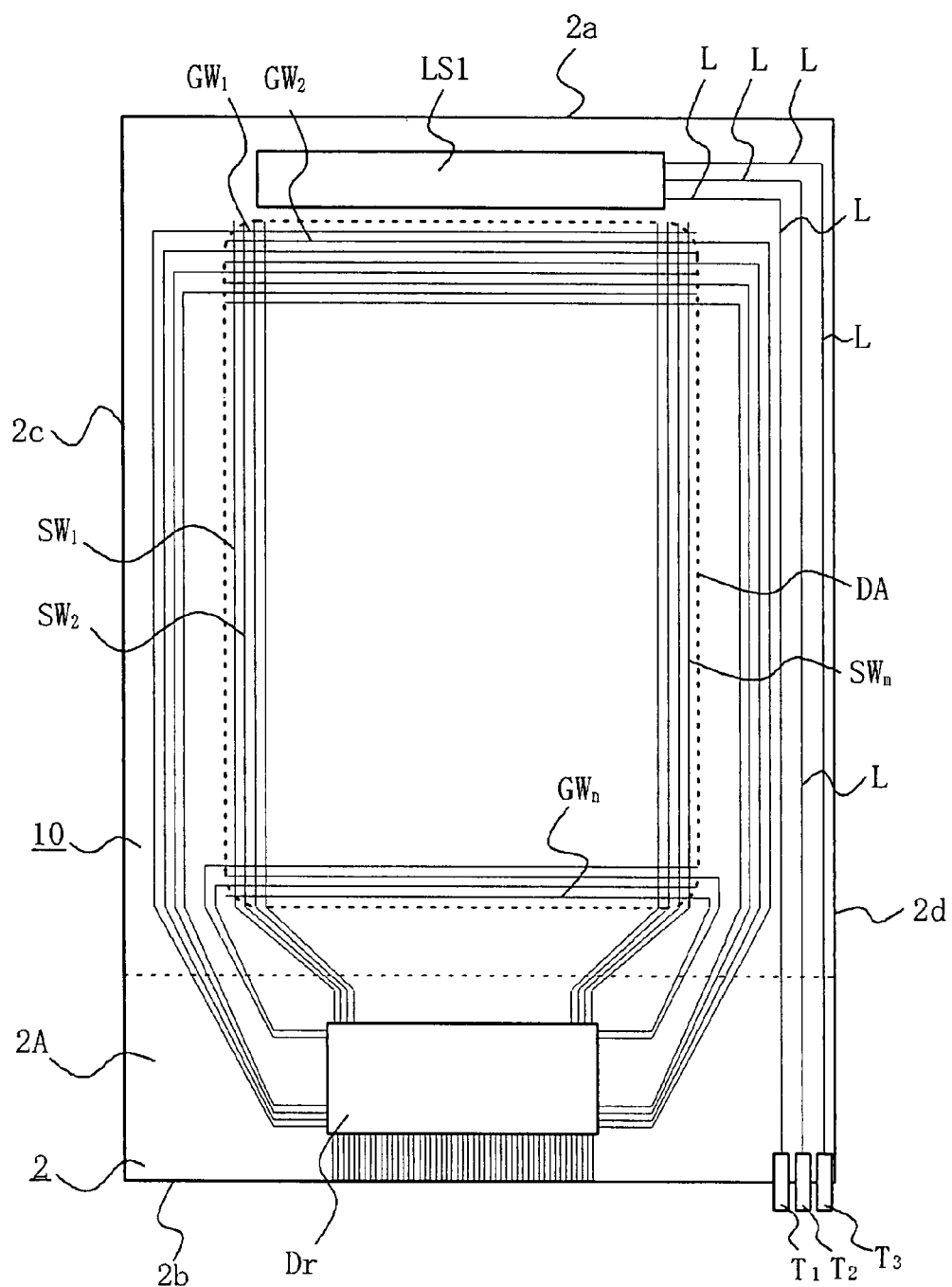
FIG. 1 is a plan view schematically showing an active matrix substrate (TFT substrate) seen through a color filter substrate included in a liquid crystal display device according to an embodiment of the present invention.

FIG. 1 is a plan view schematically showing an active matrix substrate seen through a color filter substrate included in a liquid crystal display device according to a first embodiment of the invention.

As shown in FIG. 1, the liquid crystal display device 1 includes an active matrix substrate ("TFT substrate" below) 2 and a color filter substrate ("CF substrate" below") 10 having various wiring lines formed on, for example, a rectangular transparent material such as glass and deployed opposing each other. The TFT substrate 2 is of a larger size than the CF substrate 10, so that when it is positioned opposing the CF substrate 10, an overhang portion 2A of a particular extent is formed. The structure is such that a seal material (not shown) is stuck around the peripheries of the TFT substrate 2 and the CF substrate 10, and a liquid crystal and spacers are sealed into the interior space therebetween.

On the opposed faces of the TFT substrate 2 and CF substrate 10, there are formed various wiring lines, etc. On the CF substrate 10, a black matrix made of metallic chromium, etc., provided in a matrix pattern matching the pixel regions within a display region DA of the TFT substrate 2, color filters for, say, red (R), green (G) and blue (B), that are provided in the areas enclosed by the black matrix; and a common electrode that is electrically coupled to the TFT substrate 2's electrodes and covers the opposed face of the CF substrate 10. The common electrode is formed of, for example, a transparent material such as indium oxide and tin oxide. The color filter, the black matrix, and the common electrode are not shown in detail, and are extended to the position facing a photodetector unit LS1 formed on the TFT substrate 2 and a plurality of lead-out lines L leading out from the photodetector unit LS1.

Also, a backlight (not shown) is provided as an illuminating unit on the reverse face of the TFT substrate 2. This backlight is controlled via output from a photodetector unit LS1.

The TFT substrate 2 has opposed short edges $2a$, $2b$ and opposed long edges $2c$, $2d$. At one short edge $2b$ is located the overhang portion 2A, on which are mounted a semiconductor chip Dr for a source driver and a gate driver; while at the other short edge $2a$, the photodetector unit LS1 is disposed.

The TFT substrate 2 has, on the opposed face thereof, that is, on the face that contacts with the liquid crystal, a plurality of gate lines $GW_1$ to $GW_n$ (n=2, 3, 4 . . . ) laid out in the row direction (sidewise direction) in FIG. 1 at a particular spacing, and a plurality of source lines $SW_1$ to $SW_m$ (m=2, 3, 4 . . . ) that are insulated from the gate lines $GW_1$ to $GW_n$ and are laid out in the line direction (lengthwise direction). These source lines $SW_1$ to $SW_m$ and gate lines $GW_1$ to $GW_n$ are arranged in a matrix pattern, and in the areas enclosed by the intercrossing gate lines $GW_1$ to $GW_n$ and source lines $SW_1$ to $SW_m$ there are formed switching elements (omitted from the drawing) that are turned on by scan signals from the gate lines $GW_1$ to $GW_n$, and pixel electrodes to which picture signals from the source lines $SW_1$ to $SW_m$ are supplied via the switching elements.

The areas enclosed by the gate lines $GW_1$ to $GW_n$ and the source lines $SW_1$ to $SW_m$ constitute what are termed pixels. The region where such pixels are formed is the display area DA, or in other words the image display section. For the switching elements, thin film transistors (TFTs) or the like will be employed.

Each of the gate lines $GW_1$ to $GW_n$, and source lines $SW_1$ to $SW_m$ is extended out of the display area DA, passed around the outer periphery region lying outside the display area DA, and coupled to the semiconductor chip Dr for the source driver and the gate driver. On the long edge $2d$ of the TFT substrate 2 are disposed lead-out lines L that lead out from the ambient light photosensor of the photodetector unit LS1 and are coupled to terminals $T_1$, $T_2$, $T_3$ to which an external control circuit is coupled. From this control circuit coupled to each terminal $T_1$ to $T_3$, the reference voltage, the gate voltage, etc., are supplied to the photodetector unit LS1. Also the output from the photodetector unit LS1 is delivered to the control circuit.

Figure 2:
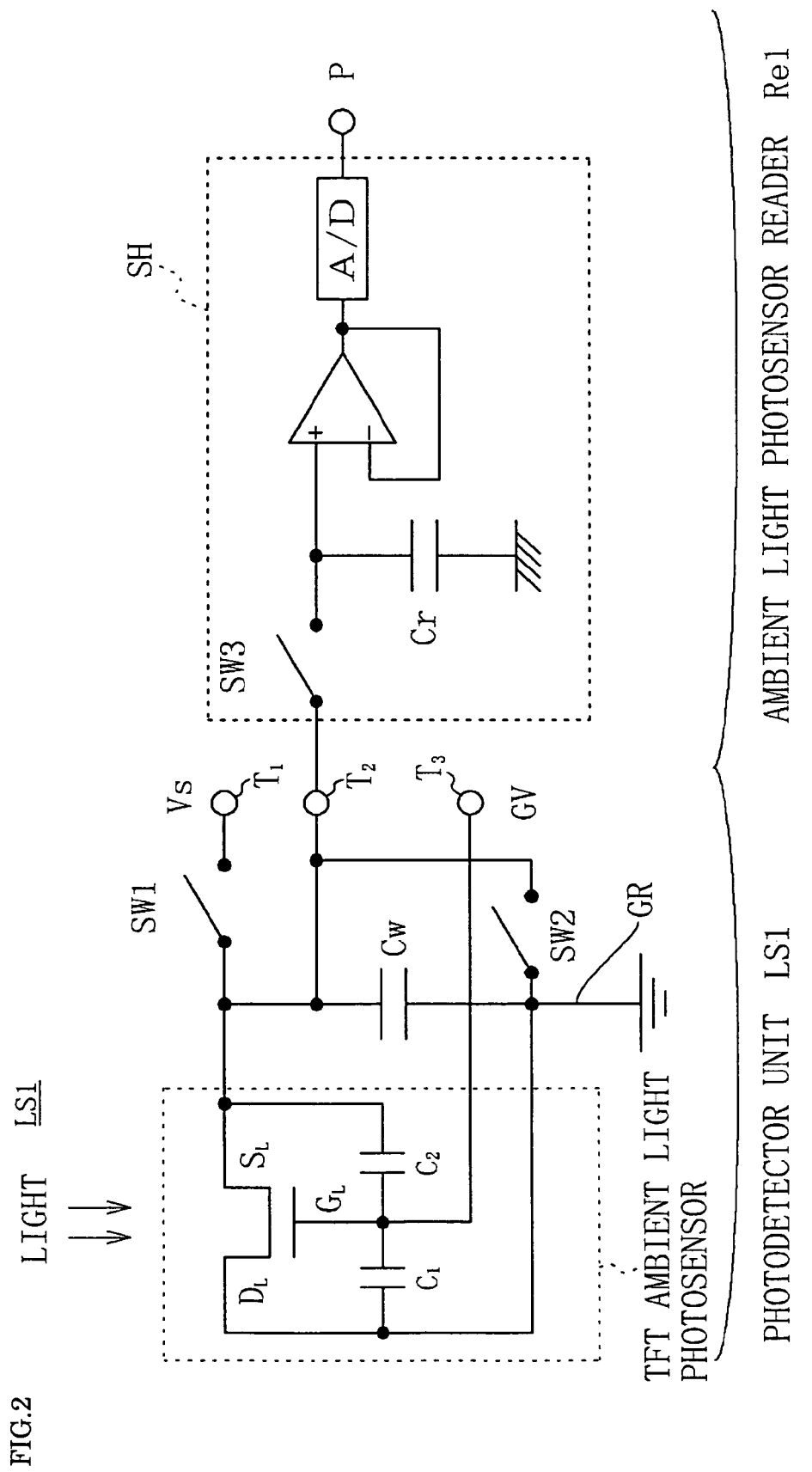
FIG. 2 is an equivalent circuit diagram of a photodetector unit and an ambient light photosensor reader.
Figure 3:
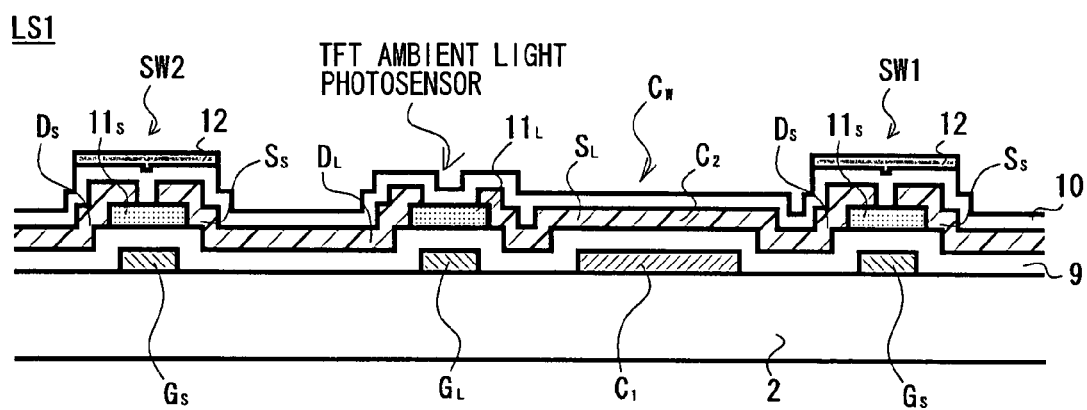
FIG. 3 is a structural cross sectional view of the photodetector unit formed on the TFT substrate in FIG. 1.

Referring to FIG. 2 and FIG. 3, the structure and the operation of the photodetector unit LS1 and the ambient light photosensor reader Re1 will now be described. FIG. 2 is an equivalent circuit diagram of a photodetector unit and an ambient light photosensor reader. FIG. 3 is a structural cross sectional view of the photodetector unit formed on the TFT substrate in FIG. 1.

As FIG. 2 shows, the photodetector unit LS1 is so configured that a capacitor Cw is coupled in parallel between the TFT ambient light photosensor's drain electrode $D_L$ and source electrode $S_L$, and the source electrode $S_L$ and one terminal of the capacitor Cw are coupled to a standard voltage supply $V_s$ via a switching element $SW_1$. Furthermore, the TFT ambient light photosensor's drain electrode $D_L$ and the other terminal of the capacitor Cw are grounded GR, and a switching element SW2 is coupled between the output line coupled to the source electrode $S_L$ and the drain electrode $D_L$. The other end of the switching element SW2 is grounded GR. As for the switching element SW2, when its end is grounded GR and the switching element SW2 is closed, the source line coupled to the source electrode is made to become a ground potential. However, the potential is not limited to the ground potential, and may be, for example, a predetermined direct voltage.

The ambient light photosensor reader Re1 is a publicly known sampling hold circuit SH including a holding capacitor Cr that stores the charge of the capacitor Cw included in the photodetector unit LS1, an OP amplifier that amplifies the output voltage from the holding capacitor Cr, and an A/D converter that converts analog output from the OP amplifier into digital data. The photodetector unit LS1 and the ambient light photosensor reader Re1 are coupled via a switching element SW3.

The TFT ambient light photosensor and the switching elements SW1 and SW2 composing the photodetector unit LS1 are both configured with TFTs, and are formed on the TFT substrate 2. Specifically, as shown in FIG. 3, first, the gate electrode $G_L$ of the TFT ambient light photosensor, one terminal $C_1$ of the capacitor Cw, and the gate electrodes Gs of the TFTs serving as the switching elements SW1, SW2 (also referred to as the "TFT switching elements") are provided on the TFT substrate 2. A gate insulator 9, made of silicon nitride, silicon oxide, or the like, is deposited to cover the surface of these elements. Provided on the gate electrode $G_L$ of the TFT ambient light photosensor and the gate electrode $G_S$ of the TFT switching elements SW1, SW2 are semiconductor layers $11_L$ and $11_S$, respectively, made of amorphous silicon or polysilicon, for example, with the gate insulator 9 therebetween. On top of the gate insulator 9, the source electrode $S_L$ and the drain electrode $D_L$, made of metal, such as aluminum or molybdenum, of the TFT ambient light photosensor and the source electrode $S_S$ and the drain electrode $D_S$ of the TFT switching elements SW1, SW2 are provided so as to be in contact with the semiconductor layers $11_L$ and $11_S$, respectively.

Furthermore, a protective insulator 10 made of, for example, an inorganic insulating material, is deposited so as to cover the surface of the TFT ambient light photosensor, the capacitor Cw, and the TFT switching elements SW1, SW2.

Also, the surface of the TFT switching elements SW1, SW2 are covered with a black matrix 12 serving as a light-blocking film so as not to be affected by external light.

The photodetector unit LS1 is formed simultaneously with the TFT switching elements for driving the liquid crystal, in a process for manufacturing the liquid crystal display panel. Thus, there is no need to especially increase the number of manufacturing processes in order to provide the photodetector unit LS1. Also, it will be possible to use multiple TFT ambient light photosensors rather than a single one, and to provide them in a row along the short edge 2a. Disposing a row of multiple TFT ambient light photosensors on the short edge will mean that if the user should accidentally obstruct some of the TFT ambient light photosensors with a finger, etc., it is unlikely that all of the TFT ambient light photosensors will be so obstructed at the same time, and those TFT ambient light photosensors that remain unobstructed will be able to sense light.

The operation of the photodetector unit LS1 and the ambient light photosensor reader Re1 will now be described.

Figure 10:
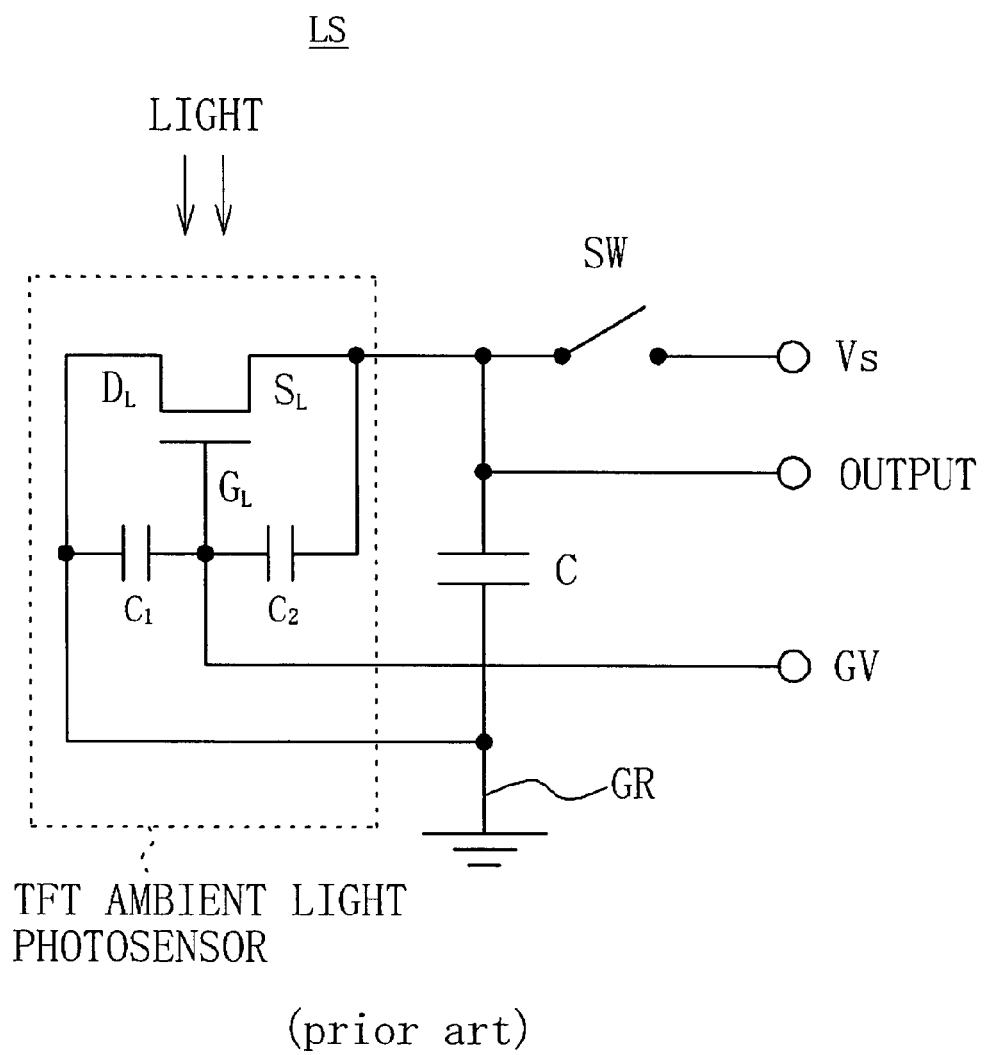
FIG. 10 is a diagram of a known photodetector circuit using a TFT ambient light photosensor.
Figure 11:
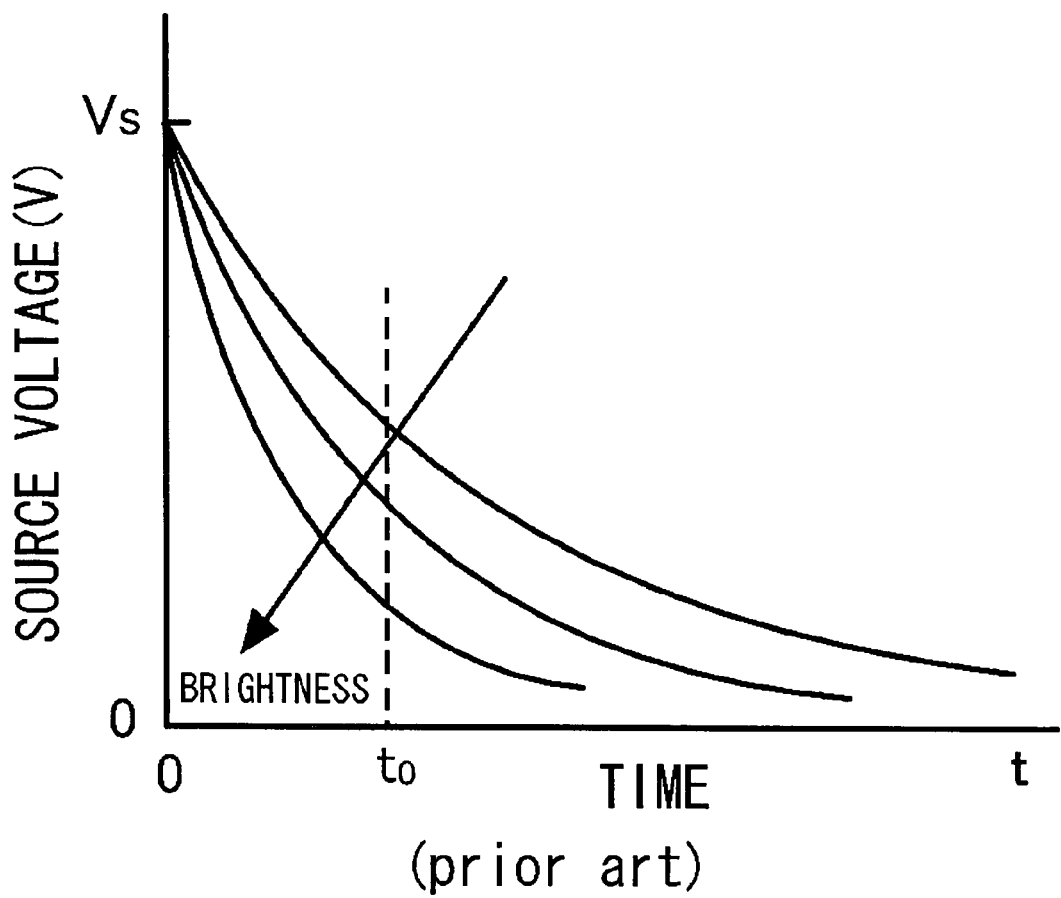
FIG. 11 shows the voltage-time curve at both ends of a capacitor included in the circuit diagram of FIG. 10 with different brightness levels.

The basic operation of the usual photo sensing, that is, the photo sensing during the operation of the liquid crystal display device 1 mounted on the mobile telephone, etc., is the same as that of the related art (by the circuit shown in FIG. 10). Namely, as shown in FIG. 2, a predetermined reverse bias voltage (−10 V) is applied to the TFT ambient light photosensor's gate electrode $G_L$ from an external control means 25 (see FIG. 4). Then the switching element SW1 is turned on, and the capacitor Cw is charged with a predetermined reference voltage Vs (for example +2 V). The switching element SW1 is turned off after the capacitor Cw is charged for a predetermined time period. In this state, when external light is shed on the TFT ambient light photosensor, the charging voltage of the capacitor Cw reduces due to the external light intensity. Therefore, the switching element SW3 is closed to charge this voltage drop value to the holding capacitor Cr. The charging voltage charged to the holding capacitor Cr, that is, the voltage drop value is proportional to the external light intensity.

At this point, it is preferable to charge the holding capacitor Cr by repeating the above operation for a plurality of times. According to this repetition, even if the voltage accumulated in the capacitor Cw varies depending on instantaneous changes in the amount of light, noise, or other factors, there are no large effects on the voltage accumulated in the holding capacitor Cr. It is therefore possible to provide stable photo-detecting results.

The voltage accumulated in the holding capacitor Cr is input and amplified in the OP amplifier and is analog/digital converted to produce a read output P. The output P from the ambient light photosensor reader Re1 is input to a controller 20 so as to control on/off of a backlight 24, etc.

Figure 4:
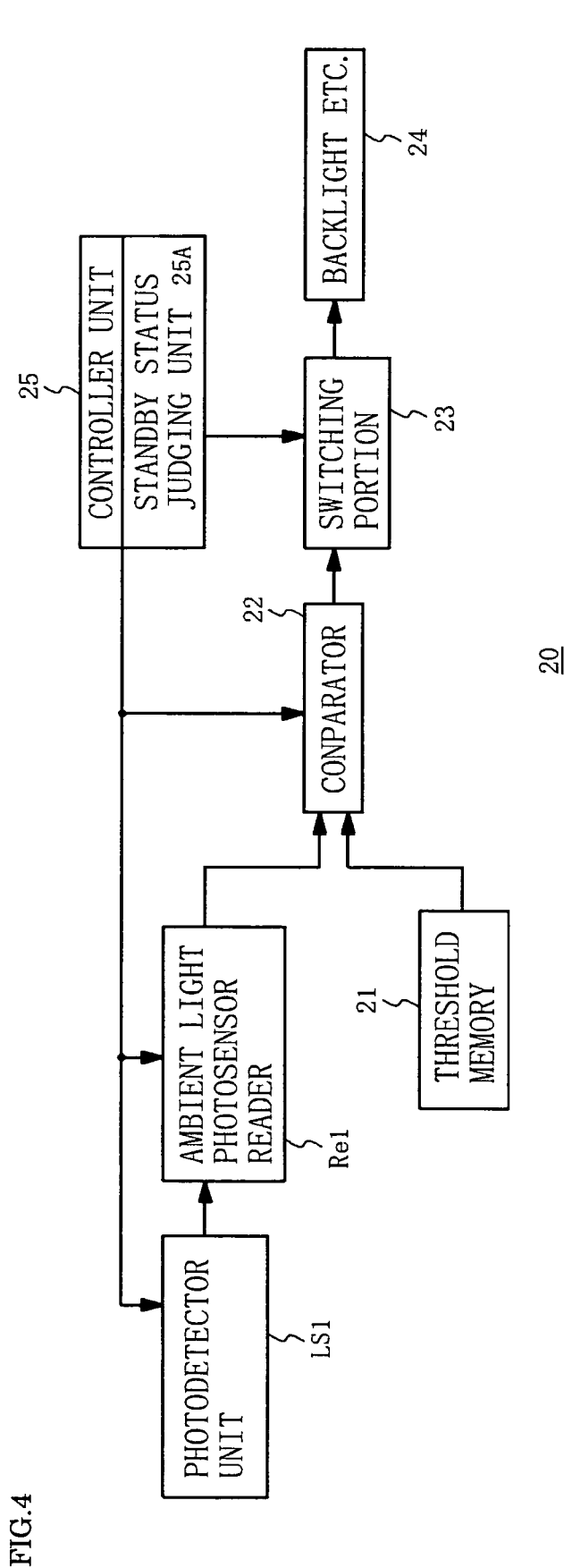
FIG. 4 is a block diagram of a controller for controlling backlights.
Figure 5:
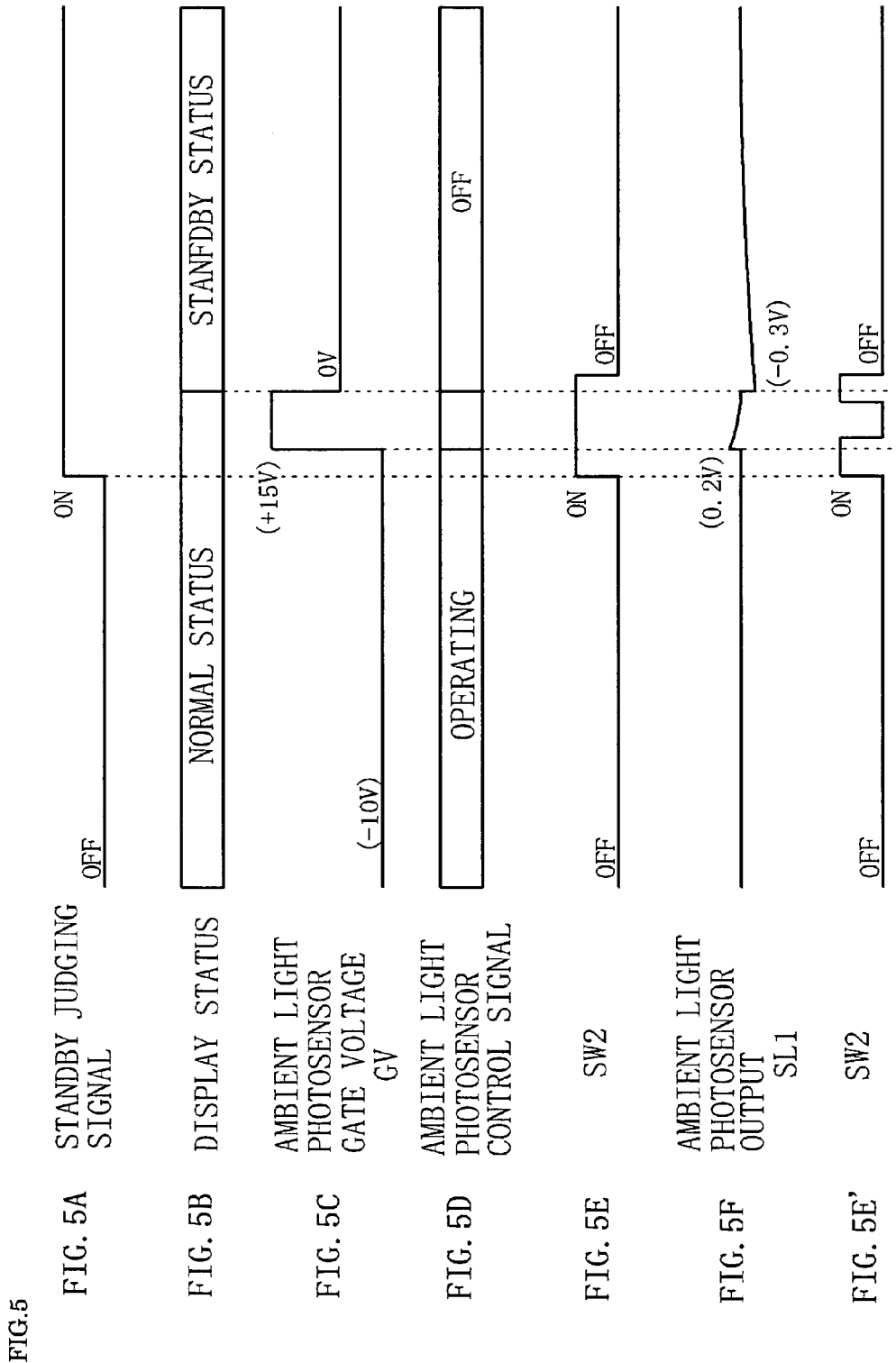
FIG. 5 is an operational waveform chart of the controller of FIG. 4.

Referring to FIG. 4 and FIG. 5, controlling on/off of such backlight 24 of the liquid crystal display device 1 mounted on the mobile telephone, etc., will now be described. FIG. 4 is a block diagram of a controller for controlling such backlight, and FIG. 5 is an operational waveform chart of the controller of FIG. 4.

The controller 20 includes a comparator 22, a threshold memory 21, a switching portion 23, the backlight 24, and a control means 25. The comparator 22 compares a read value P read from the ambient light photosensor reader Re1 and a threshold value from the threshold memory 21. The threshold memory 21 stores a reference value for turning on the backlight 24 at predetermined brightness levels. The switching portion 23 controls on/off of the backlight 24, based on the comparison result from the comparator 22. The control means 25 controls the photodetector unit LS1, the ambient light photosensor reader Re1, and the switching portion 23, etc.

The control means 25 also includes a standby status judging unit 25A for judging a standby status of equipment mounted with the liquid crystal display device 1. This standby status judging unit 25A judges as the standby status when the mobile telephone is paused for a moment, and a part or the whole region of the liquid crystal display device 1 becomes a non-display status.

When this standby status judging unit 25A judges as the standby status in response to a standby signal from the equipment, that is, when the standby status judging signal is turned on (FIG. 5A), firstly, the switching element SW2 is turned on (FIG. 5E). Then, a gate voltage GV applied to the TFT ambient light photosensor is converted from a negative voltage to a positive voltage for a predetermined period of time. More specifically, the switching element SW2 is turned on, and thereafter the gate voltage GV is converted from −10 V to +15 V for a certain period of time (FIG. 5C). By converting this gate electrode GV to the positive voltage, the operation of the photodetector unit LS1 is turned off, that is, stopped (FIG. 5D). The liquid crystal display panel is changed from the normal status to the standby status (FIG. 5B). After a certain period of time, the gate voltage is converted form +15 V to 0 V (off-voltage). At this time, the switching element SW2 is maintained in the closed (on) state. Namely, even when the gate voltage is converted to 0 V, the switching element SW2 is kept turned on for a while. Accordingly, the switching element SW2 is turned on when the equipment is in the standby status. Then, the gate voltage is converted from the negative voltage (−10 V) to the positive voltage (+15 V). Furthermore, the gate voltage is converted form the positive voltage (+15 V) to the negative voltage (0 V, off-voltage), and then the switching element SW2 is turned off. During the period when the switching element SW2 is kept turned on, the source/drain lines coupled to the TFT ambient light photosensor are grounded.

Thereby, in the photodetector circuit LS1, even when the parasitic capacitances $C_1$, $C_2$ are generated between the gate electrode $G_L$ and the source electrode $S_L$, and the gate electrode $G_L$ and the drain electrode $D_L$, charges accumulated in these capacitances are discharged via the switching element SW2. As shown in FIG. 5F, an output SL1 of the photodetector unit LS1 is only changed to +0.2 V when gated on, and to −0.3 V when gated off, for example. Hence, the phenomenon of instantaneously lowering the voltage on the drain side as a related art can be eliminated to prevent adverse effects on the external circuit.

Apart from the operation of the switching element SW2 shown in the above embodiment (see FIG. 5E), as shown in FIG. 5E', even when the switching element SW2 is turned off during the time period from just before until just after the gate voltage GV is converted from the negative voltage (−10 V) to the positive voltage (15 V), and converted from the positive voltage (15 V) to the off voltage (0 V), the same advantage as mentioned above can be obtained.

Figure 6:
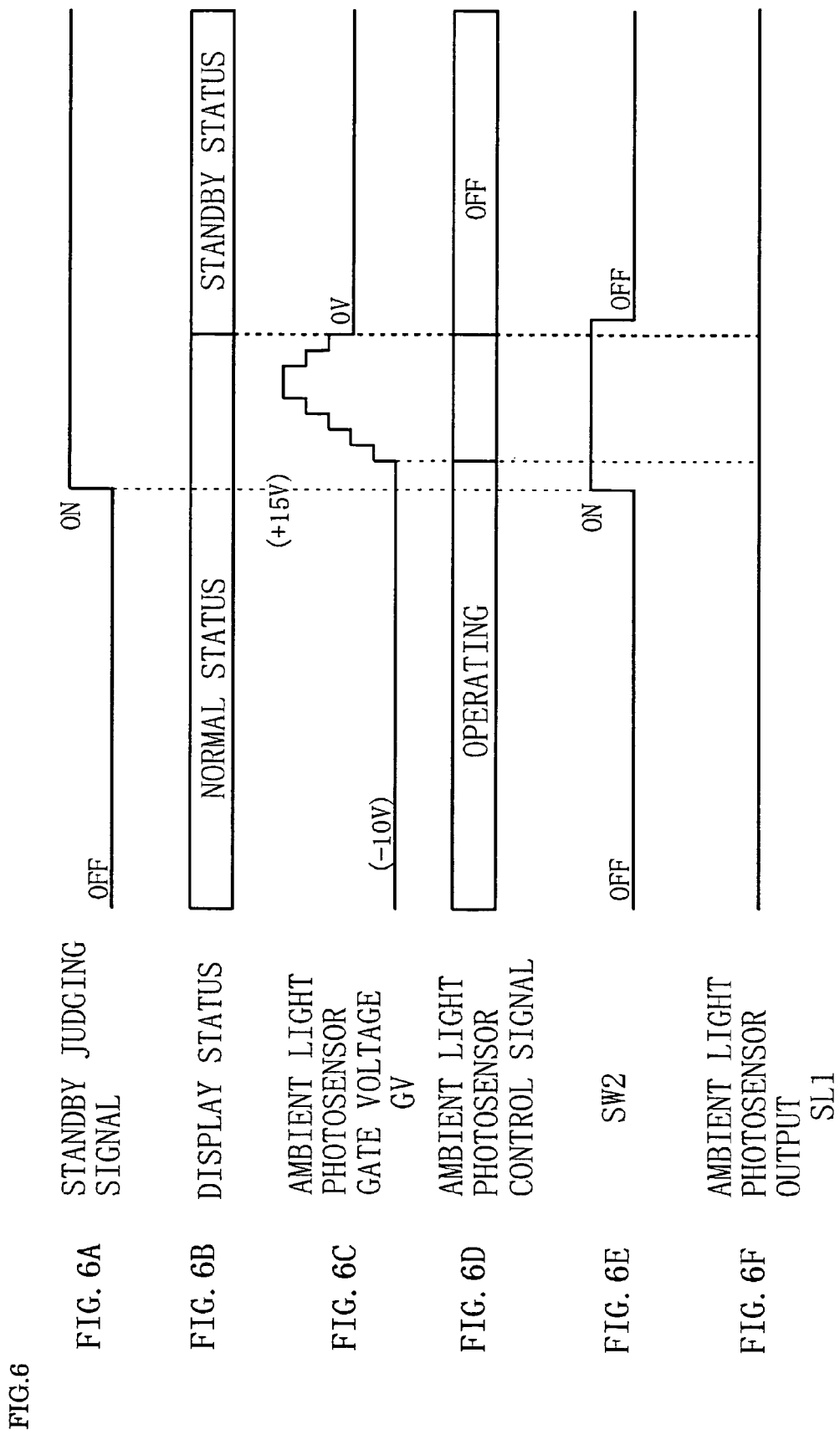
FIG. 6 is an operational waveform chart of the controller of FIG. 4 with a different applied state of gate voltages.

When the switching element SW2 is turned on, the gate voltage GV (FIG. 5C) applied to the gate electrode $G_L$ is converted at once in the present embodiment. However, the gate voltage may be, for example, converted gradually. FIG. 6 is an operational waveform chart of the controller of FIG. 4 with a different applied state of gate voltages.

The control means 25, as shown in FIG. 6C, to apply the positive voltage to the gate electrode of the TFT ambient light photosensor in the negative voltage applied state for a certain period of time, applies the gate voltage that is gradually raised when converting from the negative voltage to the positive voltage. On the other hand, the control means 25 applies the gate voltage that is gradually lowered when converting from the positive voltage to the negative voltage. As a result, as shown in FIG. 6F, the output SL1 of the photodetector unit LS1 can be made to nearly 0 V. The control means 25, after the gate voltage GV is made to 0V, turns off the photodetector unit LS1, the ambient light photosensor reader Re1, the comparator 22, and the switching portion 23 (FIG. 6D).

Hence, the standby status judging unit 25A is provided on the controller 20 for controlling the backlight 24. According to its judging result, the gate electrode $G_L$ of the TFT ambient light photosensor is applied with the positive voltage for a predetermined period of time. Thanks to this extremely easy judging control, it is possible to prevent the degradation of the TFT ambient light photosensor, to thereby maintain the sensitivity characteristic of the ambient light photosensor. The positive voltage is applied to the gate electrode $G_L$ of the TFT ambient light photosensor when the status is changed to the standby status. At this time, the ambient light photosensor reader Re1 is turned off, therefore its reading will not be affected. Furthermore, when changed to the standby status, the operation of the photodetector unit LS1, the ambient light photosensor reader Re1 and the switching portion 23 is turned off. Hence, it is possible to eliminate waste power consumption. Also, the phenomenon of instantaneously raising or lowering the voltage on the drain side can be eliminated to prevent adverse effects on the external circuit.

Second Embodiment

Figure 7:
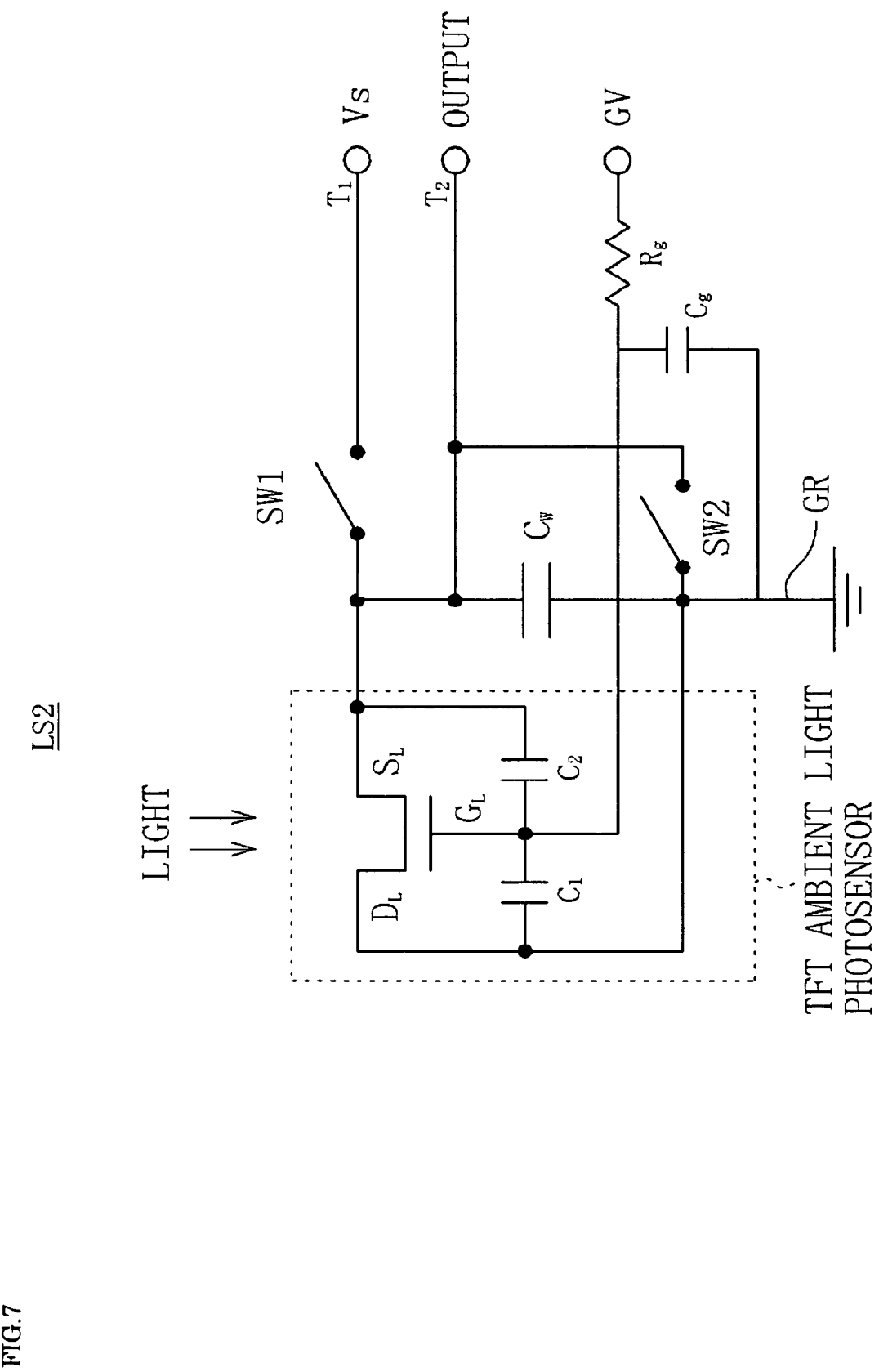
FIG. 7 is an equivalent circuit diagram of a photodetector unit of a liquid crystal display device according to a second embodiment of the present invention.
Figure 8:
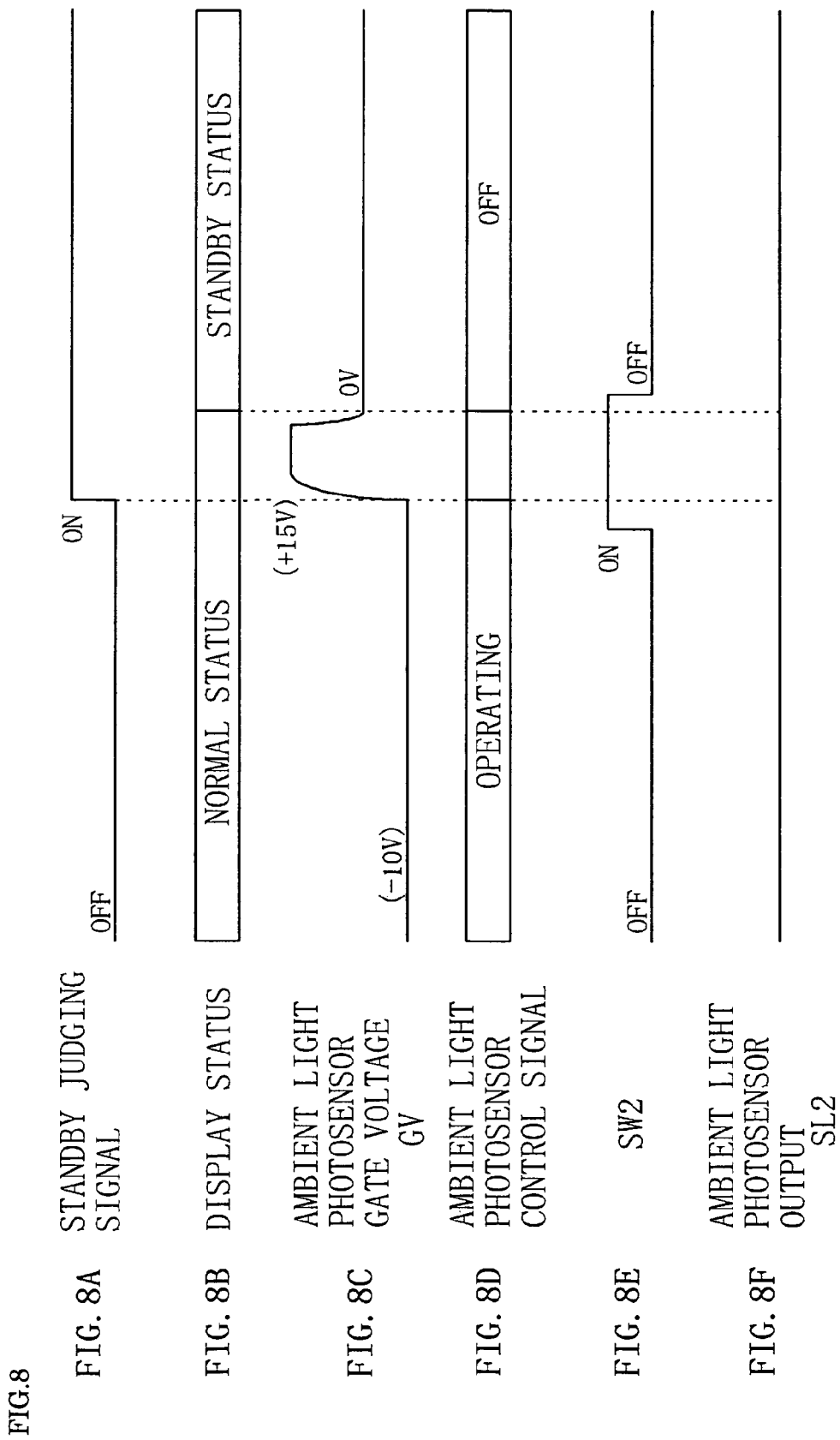
FIG. 8 is an operational waveform chart of the circuit of FIG. 7.
Figure 9:
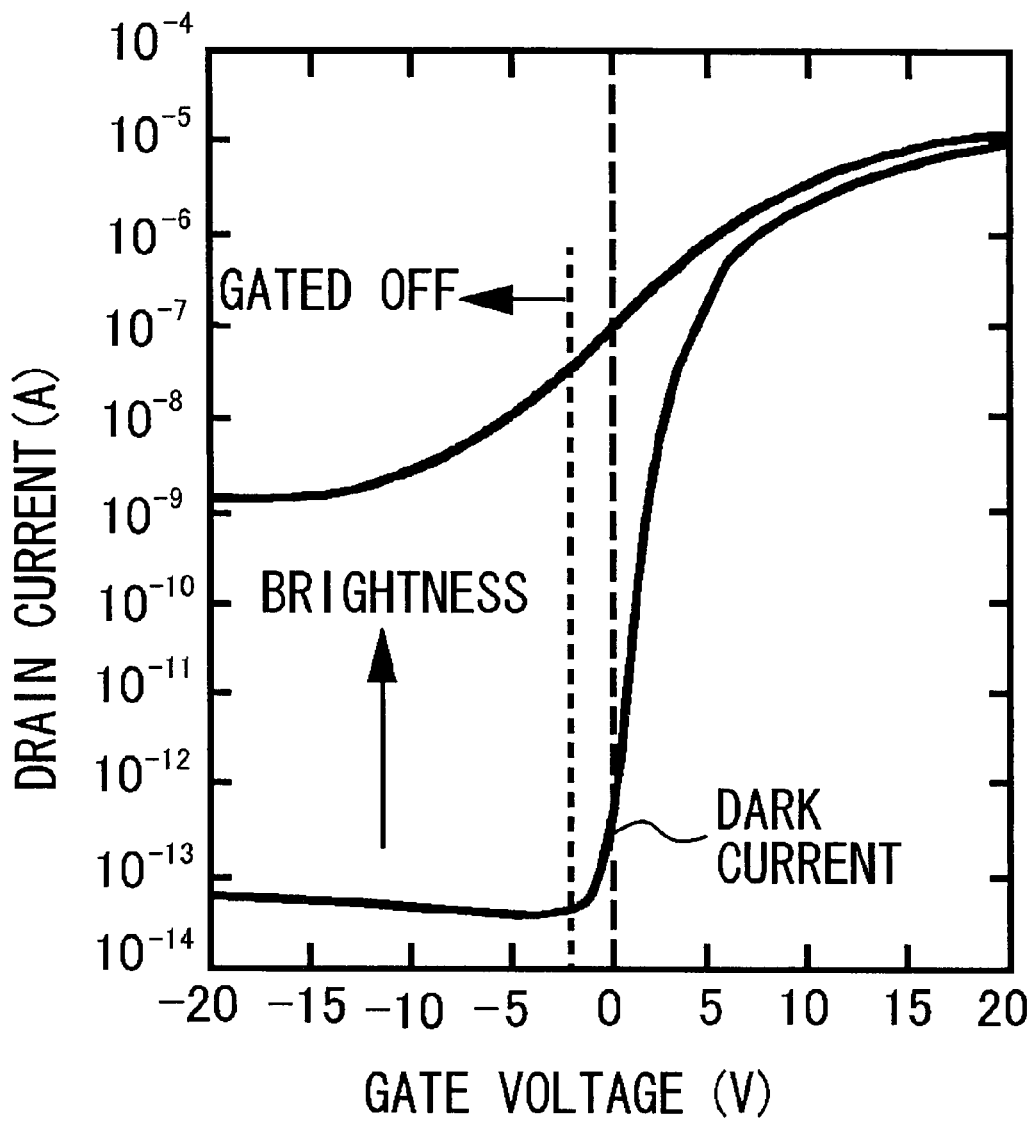
FIG. 9 shows an example of the voltage-current curve of a TFT ambient light photosensor.

Referring to FIG. 7 and FIG. 8, a liquid crystal display device according to the second embodiment of the invention will now be described. FIG. 7 is an equivalent circuit diagram of a photodetector unit built in a liquid crystal display device according to a second embodiment of the present invention. FIG. 8 is an operational waveform chart of a controller of FIG. 7.

The liquid crystal device is the same as that of the first embodiment except that a part of the photodetector unit differs. The description other than the photodetector unit will be omitted with the aid of the description of the first embodiment.

A photodetector unit LS2 has a structure in which a resistor Rg is coupled to a gate line coupled to the gate electrode $G_L$ other than the switching element SW2 of the photodetector unit LS1 of the embodiment 1. And further, this gate line is grounded GR via a capacitor Cg.

When applying a gate voltage GV of a rectangular wave in a state where the resistor Rg and the capacitor Cg are coupled on the gate line, the gate electrode $G_L$ is applied with the following voltage as shown in FIG. 8C. To apply the gate voltage in the negative voltage applied state with a positive voltage for a predetermined period of time, the gate electrode $G_L$ is applied with a rectangular wave voltage having rounded peaks when converting from the negative voltage to the positive voltage. On the other hand, the voltage becomes damped wave when converting from the positive voltage to the negative voltage. As a result, an output SL2 from the photodetector unit LS2 becomes almost 0 V. Also, the phenomenon of instantaneously raising or lowering the voltage on the drain side can be eliminated to prevent adverse effects on the external circuit.

What is claimed is:

1. A liquid crystal display device comprising:
   a liquid crystal display panel;
   a photodetector unit that is built into the liquid crystal display panel and has a TFT ambient light photosensor made of a thin film transistor (TFT) that has a source electrode, a drain electrode, and a gate electrode, and senses external light;

an ambient light photosensor reader that reads a voltage due to photo-leakage from the TFT ambient light photosensor; and a control means that controls the photodetector unit and the ambient light photosensor reader, and controls an illuminating unit that illuminates the liquid crystal display panel according to an output from the ambient light photosensor reader;

the photodetector unit having a switching element coupled between a source line coupled to the source electrode and a drain line coupled to the drain electrode of the TFT ambient light photosensor, and the control means short-circuiting the source line and the drain line of the TFT ambient light photosensor by keeping the switching element turned on when changing a gate voltage to be applied to a gate line coupled to the gate electrode of the TFT ambient light photosensor, wherein the gate voltage of the TFT ambient light photosensor in a negative voltage applied state is changed so as to be converted to a positive voltage and then converted to an off voltage after a certain period of time, and the switching element is kept turned on during a time period from just before the gate electrode is converted from the negative voltage to the positive voltage until just after the gate voltage is converted from the positive voltage to the off voltage.

2. The liquid crystal display device according to claim 1, wherein either one of the source line or the drain line of the TFT ambient light photosensor is fixed to a ground potential or a direct potential.

3. The liquid crystal display device according to claim 1, wherein the control means changes the gate voltage of the TFT ambient light photosensor gradually.

4. The liquid crystal display device according to claim 1, wherein the photodetector unit has a resistor and a capacitor coupled to the gate electrode.

5. The liquid crystal display device according to claim 1 wherein, the control means is provided with a standby status judging unit for judging whether equipment mounted with the liquid crystal display panel is in a normal operating status or in a standby status, and when the standby status judging unit judges that the equipment is changed from the normal operating status to the standby status, the switching element is turned on.

6. The liquid crystal display device according to claim 5, wherein the standby status judging unit judges as the standby status when a part of a display region included in the liquid crystal display panel becomes a display status, and the remaining region becomes a non-display status.

7. The liquid crystal display device according to claim 5, wherein the standby status judging unit judges as the standby status when a display region included in the liquid crystal display panel wholly becomes a non-display status.

8. The liquid crystal display device according to claim 1, wherein the TFT ambient light photosensor is formed together with a TFT serving as the switching element in a process for manufacturing the liquid crystal display panel.

9. A liquid crystal display device comprising:
a liquid crystal display panel;
a photodetector unit that is built into the liquid crystal display panel and has a TFT ambient light photosensor made of a thin film transistor (TFT) that has a source electrode, a drain electrode, and a gate electrode, and senses external light;

an ambient light photosensor reader that reads a voltage due to photo-leakage from the TFT ambient light photosensor; and a control means that controls the photodetector unit and the ambient light photosensor reader, and controls an illuminating unit that illuminates the liquid crystal display panel according to an output from the ambient light photosensor reader;

the photodetector unit having a switching element coupled between a source line coupled to the source electrode and a drain line coupled to the drain electrode of the TFT ambient light photosensor, and the control means short-circuiting the source line and the drain line of the TFT ambient light photosensor by keeping the switching element turned on when changing a gate voltage to be applied to a gate line coupled to the gate electrode of the TFT ambient light photosensor, wherein the gate voltage of the TFT ambient light photosensor in a negative voltage applied state is changed so as to be converted to a positive voltage and then converted to an off voltage after a certain period of time, and the switching element is kept turned on during a time period from just before until just after the gate electrode is converted from the negative voltage to the positive voltage, and from just before until just after the gate electrode is converted from the positive voltage to the off voltage.

10. The liquid crystal display device according to claim 9, wherein either one of the source line or the drain line of the TFT ambient light photosensor is fixed to a ground potential or a direct potential.

11. The liquid crystal display device according to claim 9, wherein the control means changes the gate voltage of the TFT ambient light photosensor gradually.

12. The liquid crystal display device according to claim 9, wherein the photodetector unit has a resistor and a capacitor coupled to the gate electrode.

13. The liquid crystal display device according to claim 9, wherein the control means is provided with a standby status judging unit for judging whether equipment mounted with the liquid crystal display panel is in a normal operating status or in a standby status, and when the standby status judging unit judges that the equipment is changed from the normal operating status to the standby status, the switching element is turned on.

14. The liquid crystal display device according to claim 13, wherein the standby status judging unit judges as the standby status when a part of a display region included in the liquid crystal display panel becomes a display status, and the remaining region becomes a non-display status.

15. The liquid crystal display device according to claim 13, wherein the standby status judging unit judges as the standby status when a display region included in the liquid crystal display panel wholly becomes a non-display status.

16. The liquid crystal display device according to claim 9, wherein the TFT ambient light photosensor is formed together with a TFT serving as the switching element in a process for manufacturing the liquid crystal display panel.

* * * * *